Figure 1:
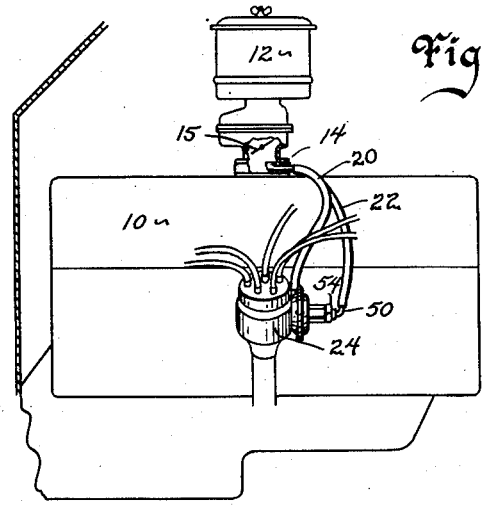

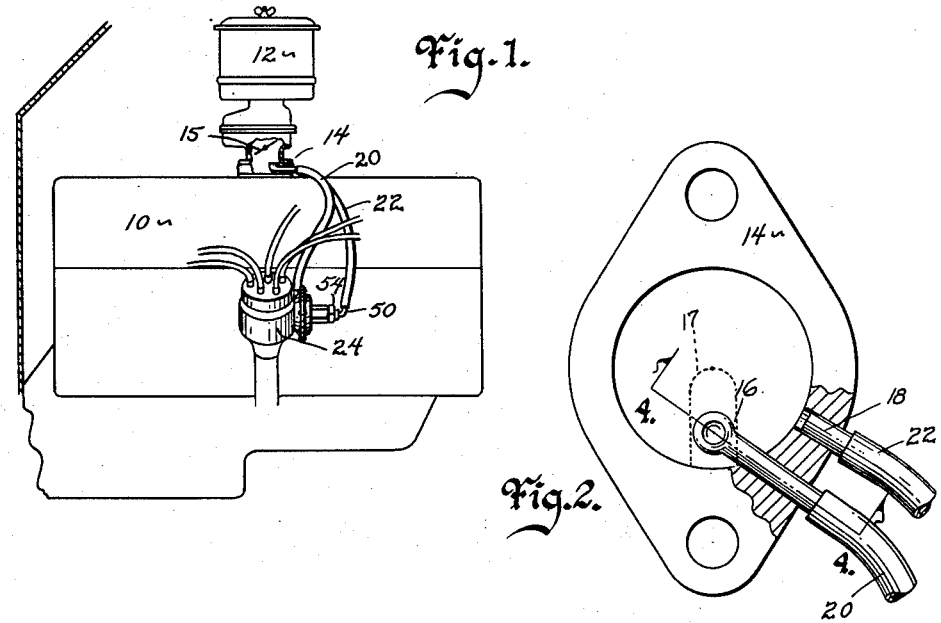
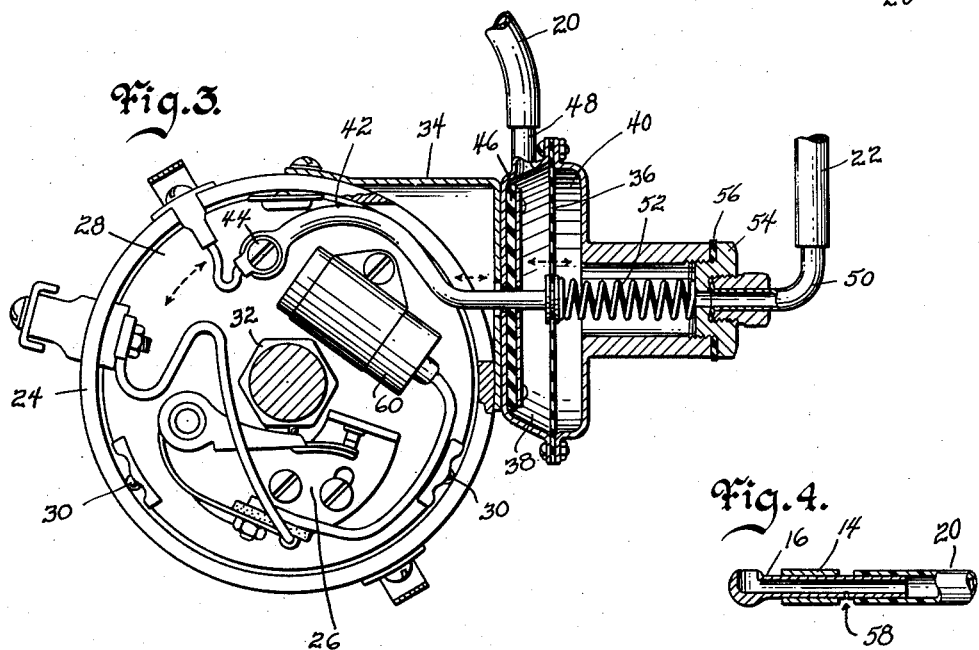

May 24, 1955

R. E. CADDOCK 2,708,918

AUTOMATIC IGNITION ADVANCE

Filed April 7, 1952

Inventor
Richard E. Caddock
by Talbert Dick & Adler
Attorneys

Witness
Edward P. Seeley

United States Patent Office 2,708,918
Patented May 24, 1955

2,708,918

AUTOMATIC IGNITION ADVANCE

Richard E. Caddock, Ames, Iowa

Application April 7, 1952, Serial No. 280,875

12 Claims. (Cl. 123—117)

My invention relates to advancing the timing of the ignition in spark ignition internal combustion engines. Specifically I have invented a novel automatic economy spark advance that increases or decreases advance of the spark according to engine requirements for best efficiency and economy or power.

This discussion relates to spark ignition internal combustion engines exclusively and the term engine used below will refer to such engines only unless it is otherwise specified. Spark advance mechanisms presently used on engines are satisfactory for best power requirements. Either the conventional centrifugal force operated power spark advance or the one that uses carburetor venturi vacuum will produce a gradually increasing spark advance throughout the range of increasing speeds of the engine. The amount of advance produced by these devices is adjusted to be correct for the richer fuel air mixtures used when maximum power is demanded. As the amount of spark advance produced by these power advances is not adequate for best efficiency at part throttle operation, another spark advancing mechanism is employed in conjunction with the power spark advance. This additional means for advancing ignition timing will be referred to hereafter as the economy spark advance, as its purpose is to provide a more advanced ignition timing for the engine at part throttle operation when the leaner economy fuel air mixtures are used.

The conventional economy spark advance employs a chamber sealed against atmospheric air and having one of its sides composed of a flexible diaphragm. Atmospheric air pressure is impressed on the side of the diaphragm not included in the chamber. The chamber is connected by an appropriate conduit to a vent in the carburetor throat just above the high side of the throttle plate. At idling speeds, therefore, when the throttle is closed, both sides of the diaphragm are vented to atmospheric air pressure. The economy spark is ineffective at idling, therefore, which is desirable. As soon as the throttle is opened, however, it brings the vent line for the diaphragm within the area on the manifold side of the throttle valve. As manifold pressure as compared to atmosphere is very low when the throttle valve is nearly closed, a substantial difference in pressure will be exerted on opposite sides of the diaphragm. The diaphragm is linked to a movable element in the timing mechanism, usually the point plate, and movement of the diaphragm causes an advance of the spark when manifold pressure is less than atmosphere. At higher power settings of the throttle, however, manifold pressure approximates atmospheric on the unsupercharged engine. At high power settings, therefore, the diaphragm returns to approximately the same position that it assumes at idling. At throttle valve settings that permit the engine to receive all the fuel air mixture it can use, the only means for advancing the time of ignition that is effective is the power spark advance described earlier. These spark advance systems are widely used and constitute a tremendous improvement over the prior manually operated spark advance found in cars such as the Model A Ford.

Even these systems have a serious shortcoming, however, as will be shown now. As noted above, the so-called economy spark advance consists of the diaphragm vented to atmospheric pressure on one side and manifold on the other whenever the throttle is open from idling. A considerable pressure differential is applied to the diaphragm almost immediately that the throttle is opened, therefore, since great differences between manifold and atmospheric pressure exists at the lower throttle settings. Manifold pressure decreases as the speed of the engine increases up to 30 miles per hour at part throttle. Beyond 30 miles per hour as the throttle is opened farther and farther, manifold pressure approaches atmospheric with the consequent reduction in the amount of spark advance caused by the diaphragm until the negligible effect noted at high power settings is reached. While it is desirable to have the decreased effect in situations requiring very high power operation, it is not desirable to have this decrease occur as speed increases at part throttle operation. The ideal arrangement would be to have an economy spark advance that gradually advanced the spark to a greater extent as the speed of the engine increased during part throttle operation and then to reduce the amount of advance or retard the spark fairly rapidly for any increase load. In the conventional systems, the greatest motion is produced by the economy spark advance when the engine is operating at part throttle and speeds of 30 miles per hour with a fixed load. The effect of the conventional economy spark advance gradually reduces as the engine speed is increased beyond this point. Of course, the power spark advance also is operative to set the time of ignition forward so that a reasonably satisfactory advance of the spark occurs at full load speeds. Because the maximum effect of the conventional economy spark advance occurs at 30 miles per hour, however, the amount of movement produced must be limited to an amount that will avoid advancing the ignition too much for this relatively low speed. Consequently, the amount of spark advance at higher engine speeds during part throttle operation is less than would be desirable. Present automatic spark advances cannot avoid this shortcoming as it is inherent in their structure and mode of operation.

Secondary disadvantages that flow from this failure of the most favorable operation of the spark advance is loss of economy. Lean fuel mixtures burn slower than do rich ones; consequently, a lean mixture that is ignited late is apt to be considerably short of completely ignited by the time the piston has reached top dead center, hereafter abbreviated to T. D. C. If the flame front has not passed throughout the chamber by the time the piston reaches T. D. C., loss of efficiency is experienced. It is known that maximum efficiency occurs with maximum pressure created when the piston reaches T. D. C. To insure that combustion is properly completed at all part throttle settings, engines are provided with fuel air mixtures that are richer than necessary for most economical operation. Furthermore, since the amount of spark advance in the upper economy speed range is particularly retarded the mixture must be far richer than necessary in the lower speed ranges. Since rich mixtures are not conductive to economy, engines with conventional ignition advance systems use more fuel than would be required if a satisfactory economy spark advance were available.

In view of the foregoing, it is the principal object of my invention to provide an automatic ignition advance that advances the time of ignition in direct proportion to engine speed during part throttle operation.

It is a further object of my invention to provide a device for producing movement bearing a direct relation to engine speeds at part throttle operation.

It is a further object of my invention to provide an automatic ignition advance that improves the economy of operation of the engine on which it is used by permitting the use of leaner air fuel mixtures.

It is a further object of my invention to provide an automatic ignition advance that increases the flexibility of operation of the engine on which it is used.

It is a further object of my invention to provide an automatic ignition advance that is easily installed on engines that are already in existence.

It is a further object of my invention to provide an automatic ignition advance that is inexpensive to manufacture and durable in use.

These and other objects will be apparent to those skilled in the art.

Figure 2:
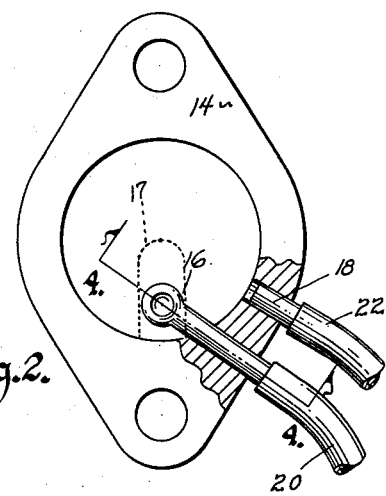
Figure 3:
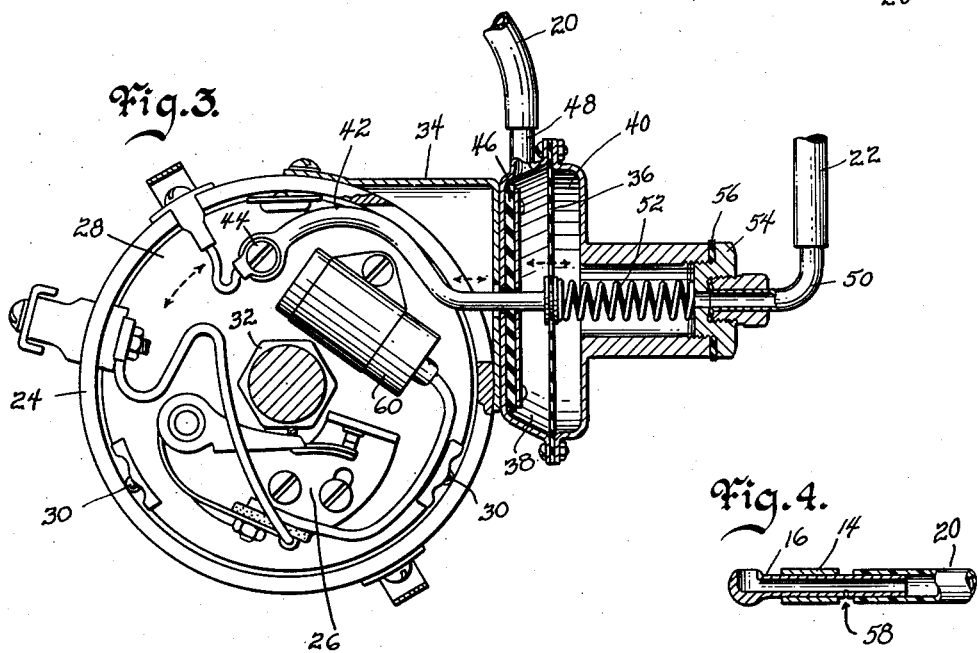

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a fragmentary side elevational view of a spark ignition internal combustion engine provided with my spark advance, Fig. 2 is an enlarged plan view of the pitot adapter plate with a portion of it broken away to illustrate its construction more fully. Broken lines show the location of the high velocity air created in the intake manifold below the high side of the throttle plate at part throttle operation, Fig. 3 is an enlarged plan view of the ignition breaker points and sectional view of my economy spark advance with a portion of the ignition point housing broken away to illustrate the construction more fully.

Figure 4:
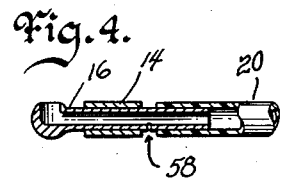

Fig. 4 is a longitudinal sectional view of the pitot tube taken on the line 4—4 of Fig. 2.

Referring to the drawings, I have used the numeral 10 to designate the engine cylinder block while the numeral 12 designates a carburetor having a throttle plate 13 connected to the intake manifold (not shown) of the engine. The pitot plate 14 is inserted between the carburetor and the intake manifold entrance with the pitot tube 16 facing into the stream of incoming air and fuel which would be up on a down draft carburetor as shown in Fig. 1. The tube must also be positioned below the high side of the throttle valve and in the area designated by the broken line 17 in Fig. 2. The area designated by broken line 17 is the area in which high velocity air was encountered as the engine speeds increased at part throttle operation. As the high velocity air pattern as shown in Fig. 2 of the drawings was established empirically for an engine having a conventional throttle valve, it may vary from the pattern shown for engines employing throttle valves that are different than the conventional throttle valve. Again a different pattern may appear if the check is made at a different distance below the throttle valve. What I have discovered and invented is the existence of a high velocity air area below the throttle valve that creates impact pressures related to engine speed at part throttle and the use of this discovery to produce a desirable mechanical movement. Since the throttle valve is slightly inclined from the horizontal in the closed position and is further inclined in the original direction of inclination as it is opened, one side of the throttle valve is always physically higher than the other. It is this physically higher side of the throttle that is referred to as the high side. Only below the high side of the throttle valve is high velocity air encountered as the throttle is opened. The plate 14 also carries a static or manifold pressure vent 18. Conduit or tubing of any appropriate type connects the pitot tube and the static tube to the spark advance unit and these tubes are numbered 20 and 22 respectively.

The numeral 24 designates the ignition breaker housing which contains the usual points 26 mounted on the movable point plate 28. The point plate is secured movably to the housing in a conventional manner by the ball bearings 30. In the center of the breaker assembly is the cam 32 which rotates in a counter clockwise direction in the structure shown in Fig. 3. Mounted on the side of the breaker point housing is the usual bracket 34 for supporting the economy spark advance. My spark advance employs a flexible diaphragm 36 with a sealed chamber on each side of it designated 38 and 40. A mechanical linkage rod 42 has one end fixed to the diaphragm while its other end is secured to the point plate in any suitable manner as by the screw 44. The manner of securing the rod is not important as long as it is not secured in a manner that would interfere with the free movement of the plate under the influence of diaphragm movement. The rod passes out of chamber 38 through a packing 46 of any suitable material to permit movement of rod 42 without permitting the passage of air to any appreciable extent into or out of chamber 38 around the rod 42. A nipple 48 leading from chamber 38 permits the ready attachment of the tube 20 to chamber 38. Chamber 40 is similarly connected to tube 22 by nipple 50. The diaphragm is urged to the left as viewed in Fig. 3 by a suitable spring means such as the coil spring 52. Nut 54 provides a means of removing and inserting the spring in the usual manner and is sealed to the end of chamber 40 by gasket 56. The pitot tube 16 is provided with an air bleed hole designated 58 in Fig. 4. The shape of the rod 42 is not material so long as it avoids binding on parts of the mechanism such as the condenser 60 and is secured to plate 28 at a point that provides favorable leverage.

The operation of my device is entirely automatic. When the engine is idling, the pitot and static tubes are both subjected to manifold pressure with consequent balancing of pressures on diaphragm 36. Spring 52 therefore moves the diaphragm to the left as viewed in Fig. 3. Rod 42 transmits this movement to point 28 in the form of counter clockwise rotation. As such movement is in the direction of rotation of the cam, the effect is to retard the spark which is desirable for idling speeds of engine rotation. As the throttle valve is opened, however, and engine speed increases so that a part throttle condition is encountered air rushing into the manifold creates a high velocity air stream that strikes the pitot tube establishing an impact pressure in chamber 38. This impact pressure will be greater than manifold pressure and in fact has been found empirically to commence at 10 miles per hour part throttle operation and to be about equal to manifold pressure plus one inch of mercury at 20 miles per hour engine speed at part throttle. When the pressure in chamber 38 exceeds that in chamber 40, some movement of the diaphragm against the urging of spring 52 occurs. Any movement tending to compress spring 52 causes the point plate to be moved in a clockwise direction which advances the moment in the cycle of operation of the engine when the cam lobe opens point 26. Spark advance is provided, therefore, by the pressure differential between impact and static pressures exerted on the diaphragm. I have found also that the difference in pressure will increase starting at 10 miles per hour at part throttle at a fairly regular rate (about one inch of mercury for each 10 miles per hour engine speed increase) up to engine speeds of 70 miles per hour at part throttle. At about 70 miles per hour the amount of increase in pressure differential created by increasing engine speed up to 80 miles per hour falls sharply to about one half the amount of increase previously experienced, and with the increase of engine speed from 80 to 90 miles per hour engine speed the amount of differential actually declines so that there is less pressure differential at 90 than at 80. At any speed when the throttle valve is positioned as to reduce or eliminate throttling, the high velocity air producing impact pressure declines. Any reduction of high velocity air causes retarding of the spark, which is not only desirable but necessary, since at high power throttle settings the fuel air mixture is enriched to insure the provision of enough fuel to react with substantially all the air inducted. These richer mixtures used for greatest power development combust more rapidly and, therefore, require some retarding of the spark to prevent completion of combustion prior to the moment the piston reaches T. D. C. Because my economy spark advance will gradually increase the amount of spark advance in proportion to engine speed at part throttle, the usual compromise as to economy fuel-air ratios is not necessary. For example, an engine that normally uses number 49 main jets and which is believed to be substantially inoperable with jets smaller than number 48 ones was found to operate rather well with number 46 jets in its carburetor. Even then the indications were that the mixture was richer than necessary for most economical performance. Yet the car tested showed a mileage increase per gallon of fuel of six miles per gallon, from 19 to 25 miles per gallon at forty miles per hour. Number 44 jets were then installed in the same engine and while the economy of engine has not been checked since these jets were installed, operation as to power and flexibility remains excellent. My new spark advance will permit more economical operation without experiencing loss of flexibility as the slower burning lean mixtures will be ignited in the correctly advanced position and will retard the spark for the rich power fuel ratios.

My new ignition economy spark advance shown in the drawings is used in conjunction with a centrifugal type advance which is not shown, as it is of the conventional type and is under the point plate. The centrifugal advance is the connection between the cam 32 and the distributor drive. When a carburetor venturi type of power spark advance rather than a centrifugal powered system is used, the diaphragm of my economy advance and chambers 38 and 40 are merely mounted in line with the conventional economy spark advance diaphragm and chamber. The conventional economy chamber is then vented to venturi vacuum only, and rod 42 connects to the diaphragm of the venturi vacuum power advance instead of to the point plate. In each case the movements produced by the power advance and the economy advance are additive and independent. The bleed hole 58 is perhaps not essential to the operation of the device, but it does serve a useful function. Under certain conditions raw gasoline flows down the walls of the carburetor and into the manifold. The pitot tube, since it faces into the air stream, will catch and retain some of this liquid gasoline except for one thing. The bleed hole 58 being open to the outside atmosphere allows relatively high pressure atmospheric air to flow into the manifold via the pitot tube. The effect of this flow of air is to establish a cone of air over the entrance to the pitot tube to prevent gasoline from entering. Any gasoline that does get into the tube will be carried out and into the engine by the air flow. By keeping the bleed hole small, about the size of a number 80 drill, for example, the amount of air entering the system is insufficient to interfere with the established pressures within the system. In actual practice this hole should be surrounded with a filter to prevent the hole from being blocked by foreign matter and to avoid any possibility of abrading matter reaching the engine. In the interest of simplicity, however, the drawings merely show the bleed hole. From the foregoing it should be clear that I have invented an economy spark advance that accomplishes the objects of my invention.

While I developed this mechanical movement means as an automatic spark advance mechanism, I am aware that this structure may be employed to produce movements for other purposes than advancing the spark. Consequently, I claim and intend to claim merely the mechanical movement structure that reacts to the difference between static and pitot pressure as distinguished from this structure in conjunction with the ignition breaker points.

Some changes may be made in the construction and arrangement of my automatic ignition advance without departing from the real spirit and purpose of my invention, and it is my intention to cover by my claims, any modified forms of structure or use of mechanical equivalents which may be reasonably included within their scope.

I claim:

1. In a means for producing mechanical movement related to the speed at part throttle operation of an internal combustion spark ignition engine with which said means is associated, a pitot tube adapted to being placed in the intake system in the area of high velocity air during part throttle operation of an internal combustion engine, a static tube adapted to being vented to the intake manifold of an internal combustion engine, a flexible diaphragm, a pair of chambers one on each side of said diaphragm and in sealed relation to said diaphragm, a conduit connecting one of said chambers to said pitot tube, a conduit connecting the other of said chambers to said static tube, and mechanical linkage connected to said diaphragm and extending to the atmosphere surrounding said chambers, whereby movement of said diaphragm is transmitted to a point outside said chambers.

2. In a means for producing mechanical movement related to the speed at part throttle of an internal combustion spark ignition engine with which said means is associated, a pitot tube adapted to being placed below the high side of the throttle valve in the intake system of an internal combustion engine, an air bleed hole in said pitot tube so placed as to be vented to atmospheric air pressure when said pitot tube is arranged in the intake manifold of an internal combustion engine, a static tube adapted to being vented to the intake manifold of an internal combustion engine, a flexible diaphragm, a pair of chambers one on each side of said diaphragm and in sealed relation to said diaphragm, a conduit connecting one of said chambers to said pitot tube, a conduit connecting the other of said chambers to said static tube, and mechanical linkage connected to said diaphragm and extending to the atmosphere surrounding said chambers, whereby movement of said diaphragm is transmitted to a point outside said chambers.

3. In an automatic spark advance for advancing the time of igniting the charge in the cylinders of a spark ignition internal combustion engine at part throttle, an ignition timing mechanism, an element of the ignition timing system movably mounted relative to other elements of the ignition timing system in a manner that causes the time of ignition to advance and retard selectively as said element is moved, a flexible diaphragm, a chamber on each side of said diaphragm and in sealed relation thereto, said chambers adapted to being secured to an engine as to be rigid with respect thereto, linkage connecting said diaphragm to said element of said ignition timing mechanism, a pitot tube mounted below the throttle in the high velocity air of the intake air stream of an internal combustion engine, a static tube adapted to being vented to the intake manifold of an internal combustion engine, a conduit connecting one of said chambers to said pitot tube, and a conduit connecting the other of said chambers to said static tube.

4. In an automatic spark advance for advancing the time of igniting the charge in the cylinders of a spark ignition internal combustion engine at part throttle and having an element of the ignition timing system movably mounted relative to other elements of the ignition timing system in a manner that causes the time of ignition to advance and retard selectively as said element is moved, a flexible diaphragm, a chamber on each side of said diaphragm and in sealed relation thereto, said chambers secured to said ignition timing system as to be rigid with respect thereto, linkage connecting said diaphragm to said element of said engine ignition system, a pitot tube mounted below the throttle in the high velocity air pattern in the intake air stream of an internal combustion engine at part throttle, an air bleed hole in said pitot tube venting it to atmospheric air, a static tube vented to the intake manifold of an internal combustion engine, a conduit connecting one of said chambers to said pitot tube, and a conduit connecting the other of said chambers to said static tube.

5. In an automatic spark advance for spark ignition internal combustion engines having the breaker points of the ignition system mounted on a point plate that is movably mounted in the breaker housing, a flexible diaphragm, a chamber on each side of said diaphragm in sealed relation thereto, a means securing said chambers and diaphragm to the breaker housing of a spark ignition internal combustion engine, linkage connecting to said diaphragm and to said point plate, a pitot tube mounted below the throttle in the high velocity air pattern of the air stream of the intake manifold, a static tube vented to intake manifold pressures, a conduit connecting one of said chambers to said pitot tube and a conduit connecting the other of said chambers to said static tube.

6. In an automatic spark advance for spark ignition internal combustion engines, a breaker housing, a point plate that is movably mounted in said breaker housing, a set of points secured to said point plate, a flexible diaphragm, a chamber on each side of said diaphragm in sealed relation thereto, a means securing said chambers and diaphragm to said breaker housing, linkage connecting said diaphragm to said point plate, a pitot tube adapted to be mounted below the throttle in the high velocity air pattern in the air stream of the intake system of an engine, a static tube adapted to being vented to the intake manifold of an engine, an air bleed hole in said pitot tube for connecting said pitot tube to the surrounding atmosphere, a conduit connecting one of said chambers to said pitot tube and a conduit connecting the other of said chambers to said static tube.

7. In combination an engine and a device for producing mechanical movement automatically in relation to engine speed at part throttle, a flexible diaphragm, a pair of chambers on opposite sides of said diaphragm and secured together as to form two adjacent chambers separated by said diaphragm, means for mounting said chambers immovably to serve as a reference point, a pitot tube mounted below the throttle in the high velocity air pattern in the air-fuel intake stream of the intake system of said engine, a static tube vented to the intake air-fuel stream of said engine, a conduit connecting said static tube to one of said chambers, a conduit connecting said pitot tube to the other one of said chambers, and means for transmitting the effect of movement of said diaphragm to a point in the atmosphere surrounding said chambers.

8. In combination an engine and a device for producing mechanical movement automatically in relation to engine speed at part throttle, a flexible diaphragm, a pair of chambers on opposite sides of said diaphragm and secured together as to form two adjacent chambers separated by said diaphragm, means for mounting said chambers immovably to serve as a reference point, a pitot tube mounted below the throttle in the high velocity air pattern in the intake manifold of said engine, an air bleed hole connecting said pitot tube to atmospheric air pressures, a static tube vented to the intake manifold of said engine, a conduit connecting said static tube to one of said chambers, a conduit connecting said pitot tube to the other one of said chambers, and means for transmitting the effect of movement of said diaphragm to a point in the atmosphere surrounding said chambers.

9. In a means adapted for use with an internal combustion engine for producing a pressure differential that changes in a substantially regular manner in response to variation in engine speed at part throttle, a pitot tube adapted to being secured to an internal combustion engine and positioned in the high velocity air pattern that is a function of throttling and created in the intake manifold, a tube adapted to being secured to an internal combustion engine and vented to static pressures, a means for registering pressure differential adapted to being secured to an internal combustion engine, and conduits connecting said pitot tube and said tube to said means for registering pressure differential.

10. In a means adapted for use with an internal combustion engine for producing a pressure differential that changes in a substantially regular manner in response to variation in engine speed at part throttle, a pitot tube adapted to being secured to an internal combustion engine and positioned in the high velocity air pattern that is a function of throttling and created in the intake manifold, a tube adapted to being secured to an internal combustion engine and vented to intake manifold pressure, a means for registering pressure differential adapted to being secured to an internal combustion engine, and conduits connecting said pitot tube and said tube to said means for registering pressure differential.

11. In a means for producing mechanical movement related to the speed at part throttle of an internal combustion spark ignition engine with which said means is associated, a pitot tube adapted to being placed below the high side of the air throttle valve in the intake system of an internal combustion engine, an air bleed hole in said pitot tube so placed as to be vented to atmospheric air pressure when said pitot tube is arranged in the intake manifold of an internal combustion engine, a flexible diaphragm, a conduit connecting one side of said flexible diaphragm to said pitot tube, and mechanical linkage connected to said diaphragm whereby movement of said diaphragm is transmitted to a point outside said diaphragm.

12. In a means for producing mechanical movement related to the speed at part throttle of an internal combustion spark ignition engine with which said means is associated, a pitot tube adapted to being placed below the high side of the air throttle valve in the intake system of an internal combustion engine, a flexible diaphragm, a conduit connecting one side of said flexible diaphragm to said pitot tube, and mechanical linkage connected to said diaphragm whereby movement of said diaphragm is transmitted to a point outside said diaphragm.

References Cited in the file of this patent

UNITED STATES PATENTS

| | | |
|---|---|---|
| 1,328,453 | Roesch | Jan. 20, 1920 |
| 1,845,818 | Spiller | Feb. 16, 1932 |
| 2,066,640 | Melcher et al. | Jan. 5, 1937 |
| 2,084,158 | Meade | June 15, 1937 |
| 2,085,817 | Melcher et al. | July 6, 1937 |
| 2,091,924 | Harmon | Aug. 31, 1937 |
| 2,373,685 | Jarvis | Apr. 17, 1945 |
| 2,380,967 | Jarvis | Aug. 7, 1945 |